United States Patent [19]

Horii et al.

[11] 3,925,279

[45] Dec. 9, 1975

[54] COLD SETTING COATING COMPOSITIONS

[75] Inventors: Hideo Horii, Yokohama; Atsushi Kaiya, Kawasaki; Yutaka Otsuki, Yokohama, all of Japan

[73] Assignee: Nippon Oil Co., Ltd., Tokyo, Japan

[22] Filed: June 5, 1974

[21] Appl. No.: 476,764

[30] Foreign Application Priority Data
June 7, 1973 Japan............................ 48-63342

[52] U.S. Cl......... 260/22 CB; 260/23 P; 260/23.7 R
[51] Int. Cl.²...................... C09D 3/34; C09D 3/66
[58] Field of Search .......... 260/22 CB, 22 CQ, 23 P

[56] References Cited
UNITED STATES PATENTS

| | | |
|---|---|---|
| 3,261,788 | 7/1966 | Carter et al................... 260/22 CQ |
| 3,264,234 | 8/1966 | Osmond........................ 260/22 CB |
| 3,518,213 | 6/1970 | Miyoshi et al................. 260/22 CB |
| 3,776,866 | 12/1973 | Nakayama..................... 260/22 CQ |

*Primary Examiner*—Ronald W. Griffin
*Attorney, Agent, or Firm*—Frank J. Jordan

[57] ABSTRACT

There is disclosed a cold setting coating composition which can produce a thick coated film having excellent physical properties, which composition is characterized by the combination of a maleinized liquid polybutadiene, a drying oil or semi-drying oil modified alkyd resin, a polyfunctional vinyl monomer, a ketone peroxide and a heavy metal salt of carboxylic acid.

2 Claims, No Drawings

COLD SETTING COATING COMPOSITIONS

BACKGROUND OF THE INVENTION

This invention relates to a cold setting coating composition which can provide a relatively thick film excellent in water resistance, oil resistance, chemical resistance and adhesiveness, more particularly to such a coating composition which essentially comprises predetermined amounts of a maleinized liquid polybutadiene, a drying oil or semi-drying oil modified alkyd resin, a polyfunctional vinyl monomer, a ketone peroxide and a heavy metal salt of carboxylic acid.

For the prevention of pollution and danger of fire, there has been wide demand for coating compositions free of soluents which are the cause of pollution. There has been demanded in particular a cold-setting type of coating composition having such excellent properties that will simplify the coating process and save the labour costs.

In the case of spray-coating, it is desired that the coating viscosity be held to a minimum. Therefore, in order to apply a coating without or with only very small amounts of solvents, the resins that are used as a binder should be reduced in their viscosity prior to coating as by means of selecting liquid resins or copolymerizing resins and liquid monomers added for dilution of the resin.

There have heretofore been proposed various methods to reduce the molecular weight of resins so as to reduce their viscosity used as a binder for a coating composition. With alkyd resins, acryl resins and the like widely used as a coating composition, attempts to reduce their molecular weight would result in deteriorated qualities of the coating composition.

At present, there are known unsaturated polyester resins, epoxy resins and the like as such that can be reduced in viscosity in the absence of solvents or with use of extremely small amounts thereof. The unsaturated polyester resins have such drawbacks that since the resins are cured by radical polymerization which polymerization would be often retarded by the presence of oxygen in the air, the film surface remains sticky for a long time, and since a main chain thereof is made of ester bonds, the surface has poor water-resistance, and since styrene used as a monomer for copolymerization and as a diluent thereof has a low boing point, it readily volatilizes to tend to become a source of pollution. In order to prevent the stickiness of unsaturated polyester resins, there has been known a method to add waxes therein for the purpose of protecting them from air. This method is not practical because luster of the film surface is extremely deteriorated. In case of using epoxy resins, viscosity thereof is generally so high that they can not be applied without dilution by solvents. Further the solvents to be used are objectionable aromatics which tend to induce pollution. As the molecular weight of epoxy resins is lowered, viscosity thereof is decreased but the properties of the cured film is so remarkably deteriorated as not to be brought into practical use.

It is well known to be able to obtain a coated film excellent in water resistance, corrosion resistance and chemical resistance by the method of baking a film of liquid polybutadienes having a thickness of 10 – 30 microns at a temperature of 140° –180°C for 30 minutes because liquid polybutadienes have a number of unsaturated groups and a main chain thereof is made of carbon atoms and hydrogen atoms. These resins are practically used as a coating for electron deposition. The above method is carried out in oxidation polymerization and hence curing starts from the film surface. In case of a thicker film, the interior thereof can not be cured. Therefore, a uniform film can be practically produced only when not exceeding 30 microns. Even such a thin film can not been cured at room temperature.

On the other hand, there has been known a method for curing at a relatively low temperature by addition of heavy metals such as cobalt and lead. But this method has a defect that a thick film may not be produced since the coated film is formed by oxidation polymerization. In case of unmodified liquid polybutadienes or maleinized liquid polybutadienes, a curing speed thereof is too slow to be put in order for practical use. In case of specially modified liquid polybutadienes such as air-oxidized liquid polybutadienes or conjugated polybutadienes, a curing rate thereof is fast but stability for storage is not well and also formation of a thick film is impossible due to oxidation polymerization thereof.

It is well known to produce thermosetting resins by curing liquid polybutadienes or their derivatives with various peroxide compounds. In this process, enough cured products can not be obtained higher than 150°C.

It is also well known to cure a mixture of liquid polybutadienes or their derivatives and monomers such as styrene and vinyltoluene by the use of peroxides or a mixture of peroxides and heavy metal salts of organic carboxylic acid. In this process, cured products having uniformity and enough strength can not be produced higher than 150°C because they can not co-polymerize at a low temperature.

There have been presented various processes for curing liquidpolybutadiene at a low temperature, for example, a process for curing a mixture of liquid 1, 2-polybutadienes and esters of fumaric acid and acrylic acid in the presence of organic peroxides (see Japanese Patent Publication No. 46-32419) and a process for curing a mixture of maleinized liquid polybutadienes and $\alpha,\beta$-ethylenic unsaturated compounds such as methyl methacrylate in the presence of organic peroxides (see Japanese Patent Publication No. 47-36865). In case of applying these curing processes to a coating, the inner parts thereof are cured according to radical polymerization but the surface remains sticky because radical polymerization thereon is affected due to the presence of oxygen in the air. In order to eliminate the above defects, there is known a process for curing the coating in the absence of oxygen or a process for curing the same to which waxes are added in the absence of the air (see Japanese Patent Publication No. 47-36865). Curing in the absence of oxygen is usually impossible with the exception of the use of electron beam. In the event that waxes are added, they move to the surface so as to screen it from the air. But the surface of the coated film is very lusterless and is not applicable without abrasion.

In these known processes, even if salts of heavy metals such as cobalt and lead are added in order to accelerate the surface curing, it takes objectionably more than 48 hours to eliminate stickiness on the surface.

SUMMARY OF THE INVENTION

It is an object of the present invention to provide a new, useful cold setting coating composition which will eliminate or alleviate the foregoing disadvantages encountered with the prior art coating compositions.

It is a specific object of the present invention to provide a cold setting coating composition which can form a thick film excellent in surface luster, water resistance, corrosion resistance, chemical resistance, adhesiveness and other physical properties.

It is another object of the present invention to provide a cold setting coating composition which can be uniformly cured in a short time at room temperature even in cases where the coated film is 1000 microns in thickness.

It is a further object of the present invention to provide a cold setting coating composition containing resins which can be of low viscosity without solvents or with extremely small amounts of solvents.

These objects and other features of this invention will be apparent from the following description taken in connection with certain embodiments of the invention.

As a result of extensive research on liquid resins, the present inventors have found the fact that a lustrous film excellent in physical properties, that is, water resistance, corrosion resistance, chemical resistance, adhesiveness and so on may be produced by curing at room temperature a mixture of a maleinized liquid polybutadiene, a drying oil or semi-drying oil modified alkyd resin and a polyfunctional monomer in the presence of a ketone peroxide and a heavy metal salt of carboxylic acid.

The present inventive concept resides in a cold setting coating composition comprising 100 parts by weight of a maleinized polybutadiene prepared by the addition of 0.5 – 30 weight percent of maleic acid anhydride to a liquid polybutadiene having a number average molecular weight of 500 – 10,000, more than 50 percent of the butadiene units in the polymer chain being linked in 1.2 bonds or esterified compound thereof; 5 – 100 parts by weight of a polyfunctional vinyl monomer; 5 – 200 parts by weight of a drying oil or semi-drying oil modified alkyd resin; 50 – 500 parts by weight of a pigment; 1 – 10 parts by weight of a ketone peroxide; and 0.01 – 5 parts by weight of a heavy metal salt of organic acid.

The maleinized polybutadiene employed herein may be easily synthesized by the process in which maleinic acid anhydride and polybutadiene are reacted for 2 – 10 hours at a temperature of 150°– 250°C. The amount of addition of maleinic acid anhydride is 0.5 – 30 weight percent, preferably 1 – 10 weight percent, of the total amount of maleinized compounds. The liquid polybutadiene when less than 0.5 weight percent maleinic acid anhydride is added thereto will fail to form a strong enough film because it is not compatible with alkyd resins or vinyl monomers and not wettable with pigments. The liquid polybutadiene when more than 30 weight percent maleinic acid anhydride is added thereto will enhance the properties of the obtained film but will require a great amount of solvents.

The liquid polybutadiene employed herein should have a number average molecular weight of 500 – 10,000, preferably 1,000 – 5,000. Repeated experiments have indicated that a number average molecular weight less than 500 tends to decrease the curing rate, while a molecular weight more than 10,000 increases objectionably viscosity of the coating so that a practical use thereof is impossible without solvents.

Butadiene residues which compose a main chain of a liquid butadiene used in the present invention constitute 1, 2-bonds having reactive branched vinyl groups. Due to the geometrical effect accruing from the reactivity of the vinyl group among themselves and their reactivity with drying oil or semi-drying oil modified alkyd resins and polyfunctional vinylmonomers derived from methacrylic acids or acrylic acids employed in the present invention in the presence of ketone peroxides and heavy metal salts of carboxylic acid, a thick uniform film can be enough cured on the surface and in the inner parts thereof at room temperature. Less than 50 percent of 1, 2-bonds would decrease the cross-linking density of the liquid polybutadiene, thereby hardness and strength of the coated film being lowered. In order to produce a film having excellent strength, formation of 1, 2-bonds is preferably more than 80%.

The liquid polybutadiene employed in the present invention is preferably prepared by chain transfer anion polymerization in which metallic sodium or organosodium is used as a catalyst or living polymerization in which butadiene is added to a system containing Lewis bases such as tetrahydrofuran and alkali metals such as sodium in the presence of an activator of organic bydrocarbons such as naphthalene.

The term polyfunctional vinylmonomers includes ethyleneglycol dimethacrylate, ethyleneglycol diacrylate, triethyleneglycol dimethacrylate, trimethylolpropane-trimethacrylate and the like. The amount to be used of these vinylmonomers is preferably in a range of 5 – 100 parts by weight per 100 parts by weight of a maleinized liquid polybutadiene. These monomers act not only as resin components of a cross-linking agent but also as a viscosity regulator as solvents in case of usual coatings.

Selection of polyfunctional vinylmonomers is one of the inventive features of the present invention. Monomers other than the above listed ones, for example, monofunctional monomers such as styrene and methylmethacrylate would fail to form a cured film at room temperature or even if the film is cured it has almost no strength. Polyfunctional monomers such as divinylbenzene and diallylphthalate would decelerate the curing rate and form unsatisfactorily a thick film having almost no softness.

Important resin components used in the present invention are drying oil or semi-drying oil modified alkyd resins. These resins remarkably improve surface driability, adhesiveness, impact resistance and so on of the coated film according to the present invention. These properties are too low in the absence of the alkyd resins to impossibly put the coating into practice. The alkyd resins are prepared by the known processes in which there are reacted unsaturated fatty acids or fatty oils such as linseed oil and bean oil, polyhydric alcohols such as glycerin, and polyatomic carboxylic acids such as phthalic acid. The alkyd resins should be used in a range of 5 – 200 parts by weight, preferably 10 – 100 parts by weight, per 100 parts by weight, per 100 parts by weight of maleinized liquid polybutadiene. It has been found that these resins when added in amounts of less than 5 parts by weight will fail to produce the above noted effects, but when added in amounts of exceeding 200 parts by weight will undesirably decrease water resistance, chemical resistance such as alkali resistance and hardness of the obtained film.

Further hard resins, for example, petroleum resins, cumarone resins and the like may be preferably added to the coating compositions so as to increase hardness of the film and lower production costs of the coating.

The term ketone peroxides typically includes methylethylketone peroxide, cyclohexanone peroxide, acetylacetone peroxide and so on. Due to the combination of these ketone peroxides and heavy metal salts of organic acid such as cobalt naphthenate, the coated film according to the present invention may be rapidly cured at room temperature. Especially even when the film has thickness of 1,000 microns, it may be uniform and tough.

DESCRIPTION OF THE PREFERRED EMBODIMENTS

The following examples are provided to further illustrate the coating compositions of the present invention, but these are not to be regarded as limiting. The term parts appearing in the examples is parts by weight unless noted otherwise.

EXAMPLE I

The mixture consisting of 80 parts maleinized liquid polybutadiene having an acid value of 53 prepared by the reaction of liquid polybutadiene having 86% 1, 2-bonds and a number average molecular weight of 1,500 and maleinic acid anhydride at 200°C for three hours, 20 parts oil modified alkyd resin having 30% phthalic acid anhydride and an oil length of 51% prepared by the reaction of safflower oil, glycerine and phthalic acid anhydride, 20 parts ethyleneglycol dimethacrylate, 80 parts titania, 1 part cobalt naphthenate containing 6% cobalt and 25 parts methylethylketone peroxide was coated on a steel plate by 10 mil applicator and then cured at room temperature. The coated film required 6 hours to be in tack free and 13 hours to be cured perfectly.

The cured film had a thickness of 150 microns and showed excellent physical properties, that is, pencil hardness of 4H, a value of Dupont's impact test of about 50 cm, a value of Ericksen test of 9 mm and passing a cross cut test. The film was subjected to an corrosion test and after a lapse of 500 hours the same did not show any objectionable change.

COMPARATIVE EXAMPLE I

The same mixture as in Example I except that an oil modified alkyd resin was not added therein was coated on a steel plate with 10 mil applicator and then cured at room temperature. The coated film required 30 hours to be in tack free and 72 hours to be cured perfectly. The cured film had a thickness of 150 microns and showed pencil hardness of 2B, a value of Dupont's impact test of 20 cm and a value of Ericksen of 6 mm and could not pass a cross cut test. It has been found that the physical properties of the film were unsatisfactory.

COMPARATIVE EXAMPLE II

The same mixture as in Example I except that ethyleneglycol dimethacrylate was not added therein was coated on a steel plate with 10 mil applicator and then cured at room temperature. However, the inner part of the film was not cured even after a lapse of one week.

EXAMPLE II

The mixture of 80 parts maleinized liquid polybutadiene having an acid value of 10 prepared by the addition of maleinic acid anhydride to liquid polybutadiene having 91% 1,2-bonds and a number average molecular weight of 3,600 in the same procedure as in Example I, 20 parts bean oil modified alkyd resin having 42% phthalic acid anhydride and an oil length of 41%, 20 parts ethyleneglycol dimethacrylate, 80 parts titania, 1 part cobalt naphthenate containing 60% cobalt, 2.5 parts methylethylketone peroxide was coated a steel plate with 10 mil applicator and then cured at room temperature. The coated film required 10 hours to be in tack free and 24 hours to be cured perfectly. The cured film had a thickness of 130 microns and showed excellent physical properties, that is, pencil hardness of 2H, a value of Dupont's impact test of 30 cm and passing a cross cut test.

EXAMPLE III

The same mixture as in Example II except that maleinized liquid polybutadiene having an acid value of 70 was prepared by the addition of maleinic acid anhydride to liquid polybutadiene having 83% 1, 2-bonds and number average molecular weight of 790 in the same procedure as in Example I was coated a steel plate and then cured at room temperature. The coated film required 12 hours to be in tack free and 24 hours to be cured perfectly. The cured film had a thickness of 130 microns and showed excellent physical properties, that is, pencil hardness of 2H, a value of Dupont's impact test of 30 cm and passing a cross cut test.

EXAMPLE IV

Maleinized liquid polybutadiene having an acid value of 54 was prepared by the addition of maleinic acid anhydride to liquid polybutadiene having 85% 1, 2-bonds and a number average molecular weight of 1,020 in the same procedure as in Example I. Esterified polybutadiene having an acid value of 5 was prepared by the esterification of said maleinized liquid polybutadiene with diethyleneglycol monobutylether and propylene oxide. The same mixture as in Example II except that said esterified polybutadiene was used instead of the maleinized liquid polybutadiene was coated on a steel plate with a 10 mil applicator and then cured at room temperature. The coated film required 13 hours to be in tack free and 26 hours to be cured perfectly. The cured film had a thickness of 130 microns and showed excellent physical properties, that is, pencil hardness of H, a value of Dupont's impact test of 40 cm and passing a cross cut test.

EXAMPLE V

The mixture of 90 parts maleinized liquid polybutadiene having an acid value of 20 prepared by the addition of maleinic acid anhydride to liquid polybutadiene having 91% 1, 2-bonds and a number average molecular weight of 3,600, 20 parts safflower oil length of 51%, 10 parts trimethylolpropane trimethacrylate, 80 parts titania, 1 part cobalt naphthenate containing 6% cobalt, 2.5 parts methylethylketone peroxide was coated on a steel plate with a 10 mil applicator and then cured at room temperature. The cured film had a thickness of 150 microns and showed excellent physical properties, that is, pencil hardness of 4H, a value of Dupont's impact test of 50 cm and passing a cross cut test.

EXAMPLE VI

The mixture of 80 parts maleinized liquid polybutadiene having an acid value of 55 and high viscosity prepared by the addition of maleinic acid anhydride to liquid polybutadiene having 91% 1, 2-bonds and a number average molecular weight of 3,600, 20 parts cyclohexane, 20 parts bean oil modified alkyd resin having 20% phthalic acid anhydride and an oil length of 80%, 20 parts ethyleneglycol dimethacrylate, 80 parts titania, 1 part cobalt naphthenate containing 6% cobalt, 2.5 parts methylethylketone peroxide was coated on a steel plate with a 10 mil applicator and then cured at room temperature. The cured film had a thickness of 50 microns and showed excellent physical properties, that is, pencil hardness of 4H, a value of Dupont's impact of above 50 cm and passing a cross cut test.

EXAMPLES VII – XI and COMPARATIVE EXAMPLES III and IV

The mixture of 80 parts maleinized liquid polybutadiene having an acid value of 70 prepared by the addition of maleinic acid anhydride to liquid polybutadiene having 83% 1, 2-bonds and a number average molecular weight of 800, 20 parts ethyleneglycol dimethacrylate, 80 parts titania, 1 part cobalt naphthenate containing 6% cobalt, 5 parts methylethylketone peroxide (50% solution) and 50% solution of safflower oil modified alkyd resin having 30% phthalic acid anhydride and an oil part length of 51%, the added amount of the alkyd resin being varied as shown in Table I, was coated on a steel plate with a 10 mil applicator and thereafter cured at room temperature. The results of these tests were given in Table I.

It will be seen from Table I that as the added amount of the oil modified alkyd resin is increased, adhesiveness of the film is improved but both chemical resistance such as alkali resistance, water resistance and corrosion resistance and pencil hardness deteriorate.

Table 1

| | Amounts of oil modified alkyd resins (parts) | Time (hrs) To tack free | Time (hrs) To cure | Pencil hardness | | Alkali resistance 5% NaOH 24 hours | Water resistance purified water 40°C, 500 hours | Salt spraying test 500 hours | Cross cut test 1mm × 1mm | 1.5mm × 1.5mm | 2mm × 2mm |
|---|---|---|---|---|---|---|---|---|---|---|---|
| Comparative Example III | 0 | 36 | 72 | 2H | Comparative Example III | Excellent | Fair | Bad | 0/100 | 0/100 | 0/100 |
| Inventive Example VII | 10 | 13 | 26 | 2H | Inventive Example VII | Excellent | Excellent | Fair | 0/100 | 50/100 | 100/100 |
| Example VIII | 20 | 12 | 24 | 2H | Example VIII | Excellent | Excellent | Excellent | 50/100 | 100/100 | 100/100 |
| Example IX | 50 | 5 | 10 | 2H | Example IX | Fair | Excellent | Excellent | 80/100 | 100/100 | 100/100 |
| Example X | 100 | 7 | 15 | H | Example X | Poor | Fair | Excellent | 98/100 | 100/100 | 100/100 |
| Example XI | 150 | 8 | 20 | F | Example XI | Poor | Poor | Fair | 95/100 | 100/100 | 100/100 |
| Comparative Example IV | 300 | 10 | 20 | 2B | Comparative Example IV | Bad | Bad | Bad | 100/100 | 100/100 | 100/100 |

Note:
Excellent: The film showed no signs of objectionable change.
Fair: The film showed no signs of objectionable change.
Poor: The film was slightly damaged.
Bad: The film was largely damaged.

What is claimed is:
1. A cold setting coating composition comprising
a. 100 parts by weight of a maleinized polybutadiene or esterified compound thereof prepared by the addition of 0.5 – 30 weight percent of maleic acid anhydride to a liquid polybutadiene or esterified compound thereof having a number average molecular weight of 500 – 10,000, more than 50 percent of the butadiene units in the polymer chain being linked in 1, 2-bonds;
b. 5 – 100 parts by weight of a polyfunctional vinyl monomer selected from the group consisting of ethyleneglycol dimethacrylate, ethyleneglycol diacrylate, triethyleneglycol dimethacrylate, and trimethylolpropane trimethacrylate;
c. 5 – 200 parts by weight of a drying oil or semi-drying oil modified alkyd resin;
d. 50 – 500 parts by weight of a pigment;
e. 1 – 10 parts by weight of a ketone peroxide; and
f. 0.01 – 5 parts by weight of a heavy metal salt of organic acid.
2. The composition as claimed in claim 1 wherein said ketone peroxide is selected from the group consisting of methylethylketone peroxide, cyclohexanone peroxide, and acetylacetone peroxide.

* * * * *